United States Patent
Mohanty et al.

(10) Patent No.: US 11,492,676 B2
(45) Date of Patent: *Nov. 8, 2022

(54) METHOD FOR PRODUCING A HIGH STRENGTH COATED STEEL SHEET HAVING IMPROVED STRENGTH, DUCTILITY AND FORMABILITY

(71) Applicant: ARCELORMITTAL, Luxembourg (LU)

(72) Inventors: Rashmi Ranjan Mohanty, East Chicago, IN (US); Hyun Jo Jun, East Chicago, IN (US); Dongwei Fan, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/931,001

(22) Filed: Jul. 16, 2020

(65) Prior Publication Data

US 2020/0347477 A1 Nov. 5, 2020

Related U.S. Application Data

(62) Division of application No. 15/322,829, filed as application No. PCT/IB2015/055039 on Jul. 3, 2015.

(30) Foreign Application Priority Data

Jul. 3, 2014 (WO) .................. PCT/IB2014/002275

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 1/18* (2013.01); *C21D 8/0226* (2013.01);
(Continued)

(58) Field of Classification Search
CPC .......... C21D 9/46; C21D 1/18; C21D 8/0226; C21D 8/0236; C21D 8/0247;
(Continued)

(56) References Cited

U.S. PATENT DOCUMENTS

| 4,159,218 A | 6/1979 | Chatfield |
| 6,114,656 A * | 9/2000 | Fairchild ............... C22C 38/001 |
| | | 219/137 WM |

(Continued)

FOREIGN PATENT DOCUMENTS

| CN | 101225499 A | 7/2008 |
| CN | 101351570 A | 1/2009 |

(Continued)

OTHER PUBLICATIONS

Machine Translation of JP-2013227653-A (Year: 2013).*

(Continued)

*Primary Examiner* — Keith Walker
*Assistant Examiner* — Ryan L Heckman
(74) *Attorney, Agent, or Firm* — Davidson, Davidson & Kappel, LLC

(57) ABSTRACT

A method is for producing a high strength coated steel sheet having a yield stress YS>800 MPa, a tensile strength TS>1180 MPa, and improved formability and ductility. The steel contains: 15%≤C≤0.25%, 1.2%≤Si≤1.8%, 2%≤Mn≤2.4%, 0.1%≤Cr≤0.25%, Al≤0.5%, the remainder being Fe and unavoidable impurities. The sheet is annealed at a temperature higher than Ac3 and lower than 1000° C. for a time of more than 30 s, then quenched by cooling it to a (Continued)

quenching temperature QT between 250° C. and 350° C., to obtain a structure consisting of at least 60% of martensite and a sufficient austenite content such that the final structure contains 3% to 15% of residual austenite and 85% to 97% of martensite and bainite without ferrite, then heated to a partitioning temperature PT between 430° C. and 480° C. and maintained at this temperature for a partitioning time Pt between 10 s and 90 s, then hot dip coated and cooled to the room temperature.

24 Claims, 1 Drawing Sheet

(51) Int. Cl.
| | |
|---|---|
| C23C 2/02 | (2006.01) |
| C23C 2/06 | (2006.01) |
| C23C 2/40 | (2006.01) |
| C21D 8/02 | (2006.01) |
| C21D 1/18 | (2006.01) |
| C22C 38/02 | (2006.01) |
| C22C 38/38 | (2006.01) |
| C22C 38/34 | (2006.01) |
| C22C 38/06 | (2006.01) |
| C22C 38/58 | (2006.01) |

(52) U.S. Cl.
CPC ......... *C21D 8/0236* (2013.01); *C21D 8/0247* (2013.01); *C22C 38/02* (2013.01); *C22C 38/06* (2013.01); *C22C 38/34* (2013.01); *C22C 38/38* (2013.01); *C22C 38/58* (2013.01); *C23C 2/02* (2013.01); *C23C 2/06* (2013.01); *C23C 2/40* (2013.01); *C21D 2211/001* (2013.01); *C21D 2211/008* (2013.01)

(58) Field of Classification Search
CPC ........ C21D 2211/001; C21D 2211/008; B32B 15/013; C22C 38/02; C22C 38/06; C22C 38/34; C22C 38/38; C22C 38/58; C23C 2/02; C23C 2/40; C23C 2/06
See application file for complete search history.

(56) References Cited

U.S. PATENT DOCUMENTS

| | | | |
|---|---|---|---|
| 6,264,760 B1 * | 7/2001 | Tamehiro | C21D 1/19 148/330 |
| 9,011,614 B2 | 4/2015 | Nakagaito et al. | |
| 9,290,834 B2 | 3/2016 | Hasegawa et al. | |
| 9,856,548 B2 | 1/2018 | Allain et al. | |
| 2003/0111145 A1 | 6/2003 | Kusinski | |
| 2006/0011274 A1 | 1/2006 | Speer et al. | |
| 2008/0251161 A1 | 10/2008 | Kashima et al. | |
| 2009/0065103 A1 | 3/2009 | Sippola | |
| 2009/0238713 A1 | 9/2009 | Kingasa et al. | |
| 2010/0003541 A1 | 1/2010 | Futamura et al. | |
| 2010/0221138 A1 | 9/2010 | Nakaya et al. | |
| 2010/0221573 A1 | 9/2010 | Drillet et al. | |
| 2010/0263773 A1 | 10/2010 | Cho | |
| 2010/0273024 A1 | 10/2010 | Bocharova et al. | |
| 2011/0146852 A1 | 6/2011 | Matsuda et al. | |
| 2011/0220252 A1 | 9/2011 | Hammer et al. | |
| 2013/0276940 A1 * | 10/2013 | Nakajima | C22C 38/06 148/333 |
| 2014/0170439 A1 | 6/2014 | Allain et al. | |
| 2014/0234655 A1 | 8/2014 | Takashima et al. | |
| 2014/0322559 A1 * | 10/2014 | Becker | C23C 2/02 428/659 |
| 2014/0377584 A1 | 12/2014 | Hasegawa et al. | |
| 2015/0101712 A1 * | 4/2015 | Futamura | C22C 38/002 148/518 |
| 2015/0203947 A1 | 7/2015 | Hasegawa et al. | |
| 2016/0016031 A1 | 6/2016 | Hasegawa et al. | |
| 2016/0355900 A1 | 12/2016 | Gil Otin et al. | |
| 2017/0130290 A1 | 5/2017 | Fan et al. | |
| 2017/0130292 A1 | 5/2017 | Mohanty et al. | |
| 2017/0137907 A1 | 5/2017 | Mohanty et al. | |
| 2017/0152579 A1 | 6/2017 | Mohanty et al. | |

FOREIGN PATENT DOCUMENTS

| | | | | |
|---|---|---|---|---|
| CN | 101437975 | A | 5/2009 | |
| CN | 101802233 | A | 8/2010 | |
| CN | 101802237 | A | 8/2010 | |
| EP | 1707645 | A1 | 10/2006 | |
| EP | 1724371 | A1 | 11/2006 | |
| EP | 2202327 | A1 | 6/2010 | |
| EP | 2267176 | A1 | 12/2010 | |
| EP | 2325346 | A1 | 5/2011 | |
| EP | 2436794 | A1 | 4/2012 | |
| EP | 2524970 | A1 | 11/2012 | |
| EP | 2757171 | A1 | 7/2014 | |
| EP | 2881481 | A1 | 6/2015 | |
| GB | 243069 | A | 12/2007 | |
| JP | 2003013177 | A | 1/2003 | |
| JP | 2006083403 | A | 3/2006 | |
| JP | 2007197819 | A | 8/2007 | |
| JP | 2008038247 | A | 2/2008 | |
| JP | 2009173959 | A | 8/2009 | |
| JP | 2009173959 | A | * 9/2009 | |
| JP | 2009209450 | A | 9/2009 | |
| JP | 5315956 | B2 | 6/2010 | |
| JP | 2012021225 | A | 2/2012 | |
| JP | 2012031462 | A | 2/2012 | |
| JP | 2012229466 | A | 11/2012 | |
| JP | 2012240095 | A | 12/2012 | |
| JP | 2013040383 | A | 2/2013 | |
| JP | 2013227653 | A | * 11/2013 | ........... C21D 8/0447 |
| JP | 2013237923 | A | 11/2013 | |
| JP | 2014/034716 | | 2/2014 | |
| JP | 2014019928 | A | 2/2014 | |
| RU | 2437945 | C2 | 12/2011 | |
| RU | 247623 | C1 | 2/2013 | |
| RU | 2518852 | C1 | 6/2014 | |
| RU | 2686729 | C2 | 4/2019 | |
| WO | WO2009099079 | A1 | 8/2009 | |
| WO | WO2010029983 | A1 | 3/2010 | |
| WO | WO2012120020 | A1 | 9/2012 | |
| WO | WO2013051160 | A1 | 4/2013 | |
| WO | WO2013146087 | A1 | 10/2013 | |

OTHER PUBLICATIONS

Machine Translation of JP-2009173959-A (Year: 2009).*
Thomas G et al: "Alloy design for fundamental study of quenched and partitioned steels", Materials Science Technology Conferance & Exhibition, Colombus, OH, United States, Oct. 16, 2011, pp. 552-567.
De Moore E et al., "Quench and Partitioning Response of a Mo-alloyed CMnSi Steel", New Developments on Metallurgy and Applications of High Strength Steels: Buenos Aires 2008; International Conference, May 28-28, Buenos Aires, Argentina, vol. 2, May 26, 2008, pp. 721-730.
Edmonds D V et al: "Quenching and partitioning martensite—A novel steel heat treatment", Material Science and Engineering A: Structural Materials: Properties, Microstructure & Processing, Lausanne, CH, vol. 438-440, Nov. 25, 2006, pp. 25-34.
Ning Zhong et al., "Microstructural Evolution of a Medium Carbon Advanced High Strength Steel Heat-Treated by Quenching-Partitioning Process", Aug. 16, 2013, John Wiley & Sons, Inc., Hoboken, NJ, USA, XP055166044, ISBN: 978-0-47-094309-0, pp. 885-889.
Garcia-Mateo et al., "On Measurement of Carbon Content in Retained Austenite in a Nanostructured Bainitic Steel," J Mater Sci, vol. 47, pp. 1004-1010 (2012).
Scott et al., "A Study of the Carbon Distribution in Retained Austenite," Scripta Materialia, vol. 56, pp. 489-492 (2007).

(56) References Cited

OTHER PUBLICATIONS

Morsdorf, L. et al: "Multiple Mechanisms of Lath Martensite Plasticity." Acta Materialia, vol. 121, 2016, pp. 202-214 (Year: 2016)mo.
Ji, Mo et al. "Effect of Grain Size Distribution on Recrystallisation Kinetics in an Fe30Ni Model Alloy." Metals, vol. 9, N. 3, 2019, p. 369. (Year 2019).

* cited by examiner

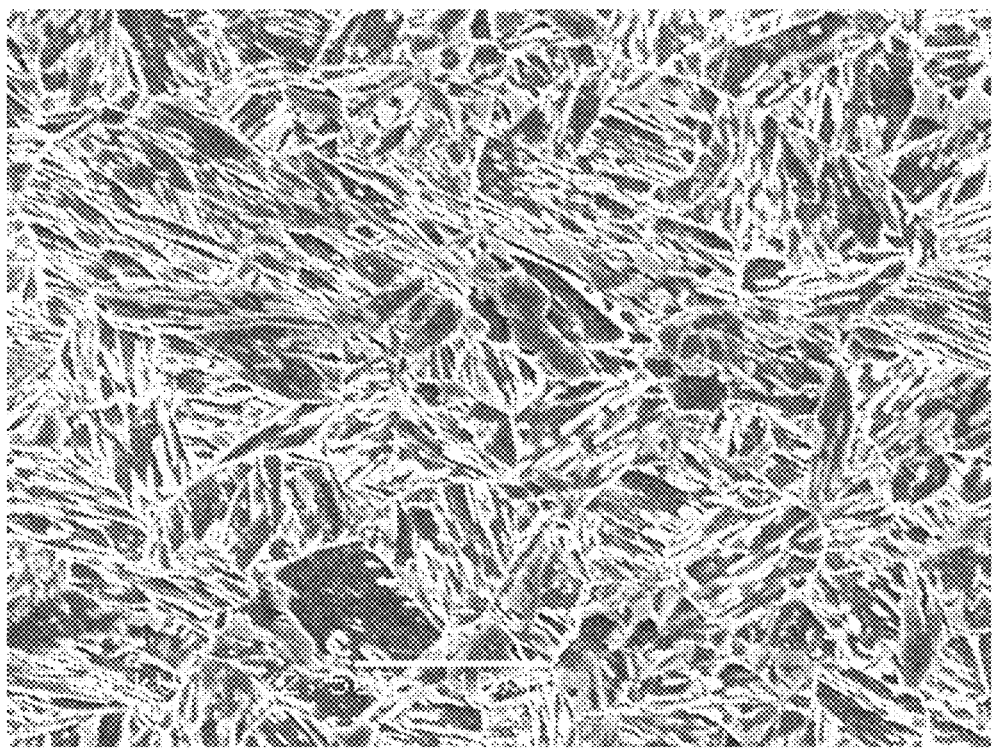

METHOD FOR PRODUCING A HIGH STRENGTH COATED STEEL SHEET HAVING IMPROVED STRENGTH, DUCTILITY AND FORMABILITY

This is a continuation of U.S. application Ser. No. 15/322,829 which has a filing date of Dec. 29, 2016 and which is a national stage of PCT/IB2015/055039 filed Jul. 3, 2015 which claims priority to PCTIB2014/002275 filed Jul. 3, 2014, the entire disclosures of which are hereby incorporated by reference herein.

The present invention relates to a method for producing a high strength coated steel sheet having improved strength, ductility and formability and to the sheets obtained with the method.

BACKGROUND

To manufacture various equipments such as parts of body structural members and body panels for automotive vehicles, it is usual to use galvanized or galvannealed sheets made of DP (dual phase) steels or TRIP (transformation induced plasticity) steels.

For example, such steels which include a martensitic structure and/or some retained austenite and which contain about 0.2% of C, about 2% of Mn, about 1.7% of Si have a yield strength of about 750 MPa, a tensile strength of about 980 MPa, a total elongation of more than 8%. These sheets are produced on continuous annealing line by quenching from an annealing temperature higher than $Ac_3$ transformation point, down to an overaging temperature above Ms transformation point and maintaining the sheet at the temperature for a given time. Then the sheet is galvanized or galvannealed.

To reduce the weight of the automotive so as to improve their fuel efficiency in view of the global environmental conservation, it is desirable to have sheets having improved yield and tensile strength. But such sheets must also have a good ductility and a good formability and more specifically a good stretch flangeability.

In this respect, it is desirable to have sheets having a yield strength YS of at least 800 MPa, a tensile strength TS of about 1180 MPa, a total elongation of at least 14% and a hole expansion ratio HER according to ISO standard 16630:2009 of more than 25%. It must be emphasized that, due to differences in the methods of measure, the values of hole expansion ration HER according to the ISO standard are very different and not comparable to the values of the hole expansion ratio $\lambda$ according to the JFS T 1001 (Japan Iron and Steel Federation standard).

SUMMARY

The present disclosure provides such sheet and a method to produce it.

A method is provided for producing a high strength coated steel sheet having an improved ductility and an improved formability, the sheet having a yield strength YS of at least 800 MPa, a tensile strength TS of at least 1180 MPa, a total elongation of at least 14% and a hole expansion ratio HER of at least 30%, by heat treating and coating a steel sheet wherein the chemical composition of the steel contains in weight %:

$0.15\% \leq C \leq 0.25\%$
$1.2\% \leq Si \leq 1.8\%$
$2\% \leq Mn \leq 2.4\%$
$0.1\% \leq Cr \leq 0.25\%$
$Al \leq 0.5\%$ the remainder being Fe and unavoidable impurities.

The heat treatment and the coating comprise the following steps:

annealing the sheet at an annealing temperature TA higher than Ac3 but less than 1000° C. for a time of more than 30 s, quenching the sheet by cooling it down to a quenching temperature QT between 250° C. and 350° C., at a cooling speed sufficient to obtain a structure consisting of martensite and austenite just after quenching, the martensite content being at least 60% and the austenite content being such that the final structure contains 3% to 15% of residual austenite and 85% to 97% of martensite and bainite without ferrite, heating the sheet up to a partitioning temperature PT between 430° C. and 480° C. and maintaining the sheet at this temperature for a partitioning time Pt between 10 s and 90 s, hot dip coatings the sheet and, cooling the sheet down to the room temperature.

The chemical composition of the steel can, optionally, satisfy one or more of the following conditions: $0.17\% \leq C \leq 0.21\%$, $1.3\% \leq Si \leq 1.6\%$ and $2.1\% \leq Mn \leq 2.3\%$.

In a particular embodiment, the hot dip coating step is a galvanizing step.

In another particular embodiment, the hot dip coating step is a galvannealing step with an alloying temperature TGA between 480° C. and 510° C.

Preferably, the cooling speed during the quenching is of at least 20° C./s, preferably at least 30° C./s.

Preferably, the method further comprises, after the sheet is quenched to the quenching temperature and before heating the sheet up to the partitioning temperature PT, a step of holding the sheet at the quenching temperature for a holding time comprised between 2 s and 8 s, preferably between 3 s and 7 s. In a particular embodiment, the at least one coated face is galvanized.

A coated steel sheet is also provided, the chemical composition of the steel containing in weight %:

$0.15\% \leq C \leq 0.25\%$
$1.2\% \leq Si \leq 1.8\%$
$2\% \leq Mn \leq 2.4\%$
$0.1\% \leq Cr \leq 0.25\%$
$Al \leq 0.5\%$ the remainder being Fe and unavoidable impurities. The structure of the steel consists of 3% to 15% of residual austenite and 85% to 97% of martensite and bainite, without ferrite. A least one face of the sheet comprises a metallic coating. The sheet has a yield strength of at least 800 MPa, a tensile strength of at least 1180 MPa, a total elongation of at least 14% and a hole expansion ratio HER of at least 30%.

The chemical composition of the steel can, optionally, satisfy one or more of the following conditions: $0.17\% \leq C \leq 0.21\%$, $1.3\% \leq Si \leq 1.6\%$ and $2.1\% \leq Mn \leq 2.3\%$.

In another particular embodiment, the at least one coated face is galvannealed.

Preferably, the C content in the retained austenite is of at least 0.9%, still preferably of at least 1.0%, and up to 1.6%.

The average austenitic grain size, i.e. the average grain size of the retained austenite, is preferably of 5 µm or less.

The average size of the grains or blocks of martensite and bainite is preferably of 10 µm or less.

BRIEF DESCRIPTION OF THE DRAWING

The invention will now be described in details but without introducing limitations and illustrated by the FIGURE which is a micrograph of example 8.

DETAILED DESCRIPTION

According to the present disclosure, the sheet is obtained by hot rolling and optionally cold rolling of a semi product which chemical composition contains, in weight %:

- 0.15% to 0.25%, and preferably more than 0.17% preferably less than 0.21% of carbon for ensuring a satisfactory strength and improving the stability of the retained austenite which is necessary to obtain a sufficient elongation. If carbon content is too high, the hot rolled sheet is too hard to cold roll and the weldability is insufficient.
- 1.2% to 1.8%, preferably more than 1.3% and less than 1.6% of silicon in order to stabilize the austenite, to provide a solid solution strengthening and to delay the formation of carbides during overaging without formation of silicon oxides at the surface of the sheet which is detrimental to coatability.
- 2% to 2.4% and preferably more than 2.1% and preferably less than 2.3% of manganese to have a sufficient hardenability in order to obtain a structure containing at least 65% of martensite, tensile strength of more than 1150 MPa and to avoid having segregation issues which are detrimental for the ductility.
- 0.1% to 0.25% of chromium to increase the hardenability and to stabilize the retained austenitic in order to delay the formation of bainite during overaging.
- up to 0.5% of aluminum which is usually added to liquid steel for the purpose of deoxidation. Preferably, the Al content is limited to 0.05%. If the content of Al is above 0.5%, the austenitizing temperature will be too high to reach and the steel will become industrially difficult to process.

The remainder being iron and residual elements resulting from the steelmaking. In this respect, Ni, Mo, Cu, Nb, V, Ti, B, S, P and N at least are considered as residual elements which are unavoidable impurities. Therefore, their contents are less than 0.05% for Ni, 0.02% for Mo, 0.03% for Cu, 0.007% for V, 0.0010% for B, 0.005% for S, 0.02% for P and 0.010% for N. Nb content is limited to 0.05% and Ti content is limited to 0.05% because above such values large precipitates will form and formability will decrease, making the 14% of total elongation more difficult to reach The sheet is prepared by hot rolling and optionally cold rolling according to the methods known by those which are skilled in the art.

After rolling the sheets are pickled or cleaned then heat treated and hot dip coated.

The heat treatment which is made preferably on a combined continuous annealing and hot dip coating line comprises the steps of:

- annealing the sheet at an annealing temperature TA higher than the $Ac_3$ transformation point of the steel, and preferably higher than $Ac_3+15°$ C. i.e. higher than about 850° C., to ensure that the structure is completely austenitic, but less than 1000° C. in order not to coarsen too much the austenitic grains. The sheet is maintained at the annealing temperature i.e. maintained between TA−5° C. and TA+10° C., for a time sufficient to homogenize the chemical composition and the structure. This time is preferably of more than 30 s but does not need to be of more than 300 s.
- quenching the sheet by cooling down to a quenching temperature QT lower than the Ms transformation point at a cooling rate enough to avoid ferrite and bainite formation. The quenching temperature is between 250° C. and 350° C. in order to have just after quenching a structure consisting of martensite and austenite. This structure contains at least 60% of martensite and contains a sufficient amount of austenite in order to be able to obtain a final structure i.e. after partitioning, coating and cooling to the room temperature, containing between 3 and 15% of residual austenite and between 85 and 97% of the sum of martensite and bainite without ferrite. Preferably, the cooling rate is higher than or equal to 20° C./s, still preferably higher than or equal to 30° C./s, for example of about 50° C./s. A cooling rate higher than 30° C./s is enough.
- reheating the sheet up to a partitioning temperature PT between 430° C. and 480° C. and preferably between 435° C. and 465° C. For example, the partitioning temperature can be equal to the temperature at which the sheet must be heated in order to be hot dip coated, i.e. between 455° C. and 465° C. The reheating rate can be high when the reheating is made by induction heater, but that reheating rate had no apparent effect on the final properties of the sheet. Preferably, between the quenching step and the step of reheating the sheet to the partitioning temperature PT, the sheet is held at the quenching temperature for a holding time comprised between 2 s and 8 s, preferably between 3 s and 7 s.
- maintaining the sheet at the partitioning temperature PT for a time Pt between 10 s and 90 s. Maintaining the sheet at the partitioning temperature means that during partitioning the temperature of the sheet remains between PT−20° C. and PT+20° C.,
- optionally, adjusting the temperature of the sheet by cooling or heating in order to be equal to the temperature at which the sheet has to be heated in order to be hot dip coated.
- hot dip coating the sheet. The hot dip coating may be, for example, galvanizing or galvannealing but all metallic hot dip coating is possible provided that the temperatures at which the sheet is brought to during coating remain less than 650° C. When the sheet is galvanized, it is done with the usual conditions. When the sheet is galvannealed, the temperature of alloying TGA must not be too high to obtain good final mechanical properties. This temperature is preferably between 500° and 580° C.
- generally, after coating, the coated sheet is processed according to the known art. In particular, the sheet is cool to the room temperature.

This treatment allows obtaining a final structure i.e. after partitioning, coating and cooling to the room temperature, containing between 3 and 15% of residual austenite and between 85 and 97% of the sum of martensite and bainite without ferrite.

Furthermore, this treatment allows obtaining an increased C content in the retained austenite, which is of at least 0.9%, preferably even of at least 1.0%, and up to 1.6%.

Moreover, the average austenitic grain size is preferably of 5 µm or less, and the average size of the blocks of bainite or martensite is preferably of 10 µm or less.

The amount of retained austenite is for example of at least 7%.

With such treatment, coated sheets having a yield strength YS of at least 800 MPa, a tensile strength of at least 1180 MPa, a total elongation of at least 14% and a hole expansion ratio HER according to the ISO standard 16630:2009 of at least 30% can be obtained.

As an example a sheet of 1.2 mm in thickness having the following composition: C=0.19%, Si=1.5% Mn=2.2%, Cr=0.2%, the remainder being Fe and impurities, was manufactured by hot and cold rolling. The theoretical Ms transformation point of this steel is 375° C. and the Ac$_3$ point is 835° C.

Samples of the sheet were heat treated by annealing, quenching and partitioning then galvanized or galvannealed, and the mechanical properties were measured.

The conditions of treatment and the properties obtained are reported at table I for the samples that were galvanized and at table II for the samples that were galvannealed. All steels have been annealed above Ac3 measured by experimental method. The sheet were held at the quenching temperature for about 3 s. The cooling speed during quenching was of about 50° C./s.

ductility properties, the partitioning temperature PT has to be near 460° C. i.e. the temperature for hot dip coating. When the partitioning temperature PT is 400° C. or below or 500° C. or above, in particular not within the range 430-480° C., the ductility is strongly reduced and is not sufficient.

Samples 4 to 9 and 11, which are galvannealed, show that a partitioning temperature of 460° C. or less yields the best results.

For example 10, the partitioning was made by heating up to 480° C. then linear cooling down to 460° C.

Examples 4 to 8 show that, with a partitioning temperature of 460° C. and a partitioning time between 10 s and 60 s, it is possible to obtain the desired properties on galvannealed sheets. These examples show also that it is preferable to have a partitioning time of less than 60 s, preferably about 30 s because with such partitioning time, the yield strength is higher than 1000 MPa while it is less than 1000 MPa when the partitioning time is 60 s. The micrograph of the FIGURE illustrates example 8 which contains 7.5% of retained austenite and 92.5% of martensite+bainite.

TABLE I

| Sample | TA ° C. | QT ° C. | PT ° C. | Pt s | YS MPa | TS MPa | UE % | TE % | HER % | RA % | RA grain size μm | C % in RA % | BM grain size μm |
|---|---|---|---|---|---|---|---|---|---|---|---|---|---|
| 1 | 870 | 300 | 400 | 60 | 1169 | 1265 | 4 | 4 | | | | | |
| 2 | 870 | 300 | 460 | 60 | 1029 | 1182 | 10 | 15 | 40 | 7 | ≤5 | 1.03 | ≤10 |
| 3 | 870 | 300 | 500 | 60 | 883 | 1181 | 7 | 9 | | | | | |

TABLE II

| Sample | TA ° C. | QT ° C. | PT ° C. | Pt s | TGA ° C. | YS MPa | TS MPa | UE % | TE % | HER % | RA % | RA grain size μm | C % in RA % | BM grain size μm |
|---|---|---|---|---|---|---|---|---|---|---|---|---|---|---|
| 4 | 870 | 300 | 460 | 30* | 500 | 1028 | 1194 | 10 | 15 | 32 | 7.7 | ≤5 | 1.05 | ≤10 |
| 5 | 870 | 300 | 460 | 60 | 500 | 973 | 1201 | 10 | 15 | 30 | 7.5 | ≤5 | 1.03 | ≤10 |
| 6 | 870 | 300 | 460 | 10* | 500 | 1074 | 1203 | 9 | 14 | | | | | |
| 7 | 870 | 300 | 460 | 10** | 500 | 938 | 1208 | 9 | 14 | | | | | |
| 8 | 870 | 300 | 460 | 60* | 500 | 973 | 1201 | 10 | 15 | 30 | | | | |
| 9 | 870 | 300 | 440 | 30 | 500 | 1003 | 1201 | 9 | 14 | | | | | |
| 10 | 870 | 300 | 460-480 | 30 | 500 | 950 | 1216 | 10 | 13 | | | | | |
| 11 | 870 | 300 | 480 | 30 | 500 | 857 | 1193 | 9 | 9 | | | | | |

*reheating rate after quenching: 5° C./s
**reheating rate after quenching: 20° C./s In these tables, TA is the annealing temperature, QT the quenching temperature, PT the partitioning temperature, Pt the time of maintaining at the partitioning temperature, TGA the temperature of alloying for the sheets that are galvannealed, YS is the yield strength, Ts is the tensile strength, UE is the uniform elongation, Te is the total elongation and HER is the hole elongation ratio measured according to the ISO standard 16630:2009. RA % is the amount of retained austenite in the microstructure, RA grain size is the average austenite grain size, C % in RA is the C content in the retained austenite, and BM grain size is the average size of the grains or blocks of martensite and bainite.

Samples 1, 2, 3 which are galvanized show that in order to obtain the desired properties and more specifically the Examples 10 and 11 show that, when the partitioning temperature is above 460° C., the ductility is significantly reduced.

Example 9 shows that, on the contrary, when the partitioning temperature is 440° C., i.e. lower than 460° C., the properties and in particular ductility remain good.

What is claimed is:

1. A method for producing a high strength coated steel sheet having an improved ductility and an improved formability, the coated steel sheet having a yield strength YS of at least 800 MPa, a tensile strength TS of at least 1180 MPa, a total elongation of at least 14% and a hole expansion ratio HER of at least 30%, comprising:

providing a steel sheet having a chemical composition including in weight %:
0.15%≤C≤0.25%
1.2%≤Si≤1.8%
2%≤Mn≤2.4%
0.1%≤Cr≤0.25%
Al≤0.5%
a remainder being Fe and unavoidable impurities,
annealing the sheet at an annealing temperature TA higher than Ac3 but less than 1000° C. for a time of more than 30 s,
quenching the sheet by cooling it down to a quenching temperature QT between 250° C. and 350° C., at a cooling speed sufficient to obtain a final structure consisting of martensite, bainite and austenite just after quenching, and such that the final structure consists of, by volume fraction, between 3% to 15% of retained austenite and 85% to 97% of a sum of martensite and bainite, with a martensite content of at least 60%, by volume fraction,
heating the sheet up to a partitioning temperature PT between 430° C. and 460° C. and maintaining the sheet at this temperature for a partitioning time Pt between 10 s and 90 s,
hot dip coating the sheet, the hot dip coating step being a galvannealing step with an alloying temperature TGA between 480° C. and 510° C., and
cooling the sheet down to the room temperature.

2. The method according to claim 1, wherein the chemical composition of the steel sheet includes 0.17%≤C≤0.21%.

3. The method according to claim 1, wherein the chemical composition of the steel sheet includes 1.3%≤Si≤1.6%.

4. The method according to claim 1, wherein the chemical composition of the steel sheet includes 2.1%≤Mn≤2.3%.

5. The method according to claim 1, wherein the cooling speed during quenching is at least 20° C./s.

6. The method according to claim 5, wherein the cooling speed during quenching is at least 30° C./s.

7. The method according to claim 1, further comprising, after the step of quenching and before the step of heating, a step of holding the steel sheet at the quenching temperature QT for a holding time between 2 s and 8 s.

8. The method according to claim 7, wherein the holding time at the quenching temperature QT is between 3 s and 7 s.

9. The method according to claim 1, wherein the C content in the retained austenite is of at least 0.9% in weight %, or wherein the C content in the retained austenite is of at least 1.0% in weight %.

10. The method according to claim 9, wherein the C content in the retained austenite is up to 1.6% in weight %.

11. The method according to claim 1, wherein the average grain size of the retained austenite is of 5 μm or less.

12. The method according to claim 1, wherein the final structure includes at least 7% of retained austenite by volume fraction.

13. The method according to claim 1, wherein the partitioning time Pt is of at most 30 s.

14. The method according to claim 1, wherein heating the sheet up to a partitioning temperature PT is carried out with a reheating rate greater or equal to 5° C./s and below or equal to 20° C./s.

15. The method according to claim 1, wherein bainite has an average grain size of 10 μm or less and martensite has an average block size of 10 μm or less.

16. The method according to claim 1, wherein the coated steel sheet has a yield strength YS of at least 973 MPa.

17. A method for producing a high strength coated steel sheet having an improved ductility and an improved formability, the coated steel sheet having a yield strength YS of at least 800 MPa, a tensile strength TS of at least 1180 MPa, a total elongation of at least 14% and a hole expansion ratio HER of at least 30%, comprising:
providing a steel sheet having a chemical composition including in weight %:
0.15%≤C≤0.25%
1.2%≤Si≤1.8%
2%≤Mn≤2.4%
0.1%≤Cr≤0.25%
Al≤0.5%
a remainder being Fe and unavoidable impurities,
annealing the sheet at an annealing temperature TA higher than Ac3 but less than 1000° C. for a time of more than 30 s,
quenching the sheet by cooling it down to a quenching temperature QT between 250° C. and 350° C., at a cooling speed sufficient to obtain a final structure consisting of martensite, bainite and austenite just after quenching, and such that the final structure consists of, by volume fraction, between 3% to 15% of retained austenite and 85% to 97% of a sum of martensite and bainite, with a martensite content of at least 60%, by volume fraction,
heating the sheet up to a partitioning temperature PT between 430° C. and 480° C. and maintaining the sheet at this temperature for a partitioning time Pt between 10 s and 90 s,
hot dip coating the sheet, the hot dip coating step being a galvanizing step, and cooling the sheet down to the room temperature.

18. The method according to claim 17, further comprising, after the step of quenching and before the step of heating, a step of holding the steel sheet at the quenching temperature QT for a holding time between 2 s and 8 s.

19. The method according to claim 18, wherein the holding time at the quenching temperature QT is between 3 s and 7 s.

20. The method according to claim 17, wherein the C content in the retained austenite is of at least 0.9% in weight %, or wherein the C content in the retained austenite is of at least 1.0% in weight %.

21. The method according to claim 17, wherein the C content in the retained austenite is up to 1.6% in weight %.

22. The method according to claim 17, wherein the average grain size of the retained austenite is of 5 μm or less.

23. The method according to claim 17, wherein bainite has an average grain size of 10 μm or less and martensite has an average block size of 10 μm or less.

24. The method according to claim 17, wherein the coated steel sheet has a yield strength YS of at least 1029 MPa.

* * * * *